United States Patent
Luomi et al.

(10) Patent No.: US 11,546,779 B2
(45) Date of Patent: Jan. 3, 2023

(54) METHOD AND APPARATUS FOR ACCELERATING ESTIMATION OF A RADIO MODEL OF AN ACCESS POINT

(71) Applicant: HERE Global B.V., Eindhoven (NL)

(72) Inventors: Marko Luomi, Lempäälä (FI); Lauri Aarne Johannes Wirola, Tampere (FI); Petri Rauhala, Tampere (FI)

(73) Assignee: HERE Global B.V., Eindhoven (NL)

(*) Notice: Subject to any disclaimer, the term of this patent is extended or adjusted under 35 U.S.C. 154(b) by 94 days.

(21) Appl. No.: 17/082,887

(22) Filed: Oct. 28, 2020

(65) Prior Publication Data

US 2022/0132330 A1   Apr. 28, 2022

(51) Int. Cl.
*H04W 24/02* (2009.01)
*H04L 43/12* (2022.01)
(Continued)

(52) U.S. Cl.
CPC ............ *H04W 24/02* (2013.01); *H04L 43/12* (2013.01); *H04W 24/08* (2013.01); *H04W 64/003* (2013.01)

(58) Field of Classification Search
CPC ..... H04W 64/00; H04W 4/33; H04W 64/006; H04W 4/029; H04W 4/023; H04W 24/02; H04W 84/12; H04W 4/02; H04W 4/025; H04W 88/08; H04W 48/16; H04W 16/18; H04W 24/04; H04W 48/20; H04W 84/045; H04W 16/22; H04W 52/0206; H04W 8/005; H04W 16/20; H04W 36/08;
(Continued)

(56) References Cited

U.S. PATENT DOCUMENTS 8,478,297 B2   7/2013  Morgan et al.
10,114,104 B1  10/2018 De Lorenzo et al.
(Continued)

FOREIGN PATENT DOCUMENTS

EP   1 592 273 A2   11/2005
EP   3 264 643 A1    1/2018

OTHER PUBLICATIONS

Tuta et al., "A Self-Adaptive Model-Based Wi-Fi Indoor Localization Method", Sensors 2016 (Dec. 6, 2016), 28 pages.
(Continued)

*Primary Examiner* — Daniel Lai
(74) *Attorney, Agent, or Firm* — Alston & Bird LLP

(57) ABSTRACT

A method, apparatus and computer program product are provided to accelerate the estimation of a radio model of an access point within a radio environment, such as an access point that has been newly added to or relocated within the radio environment. In the context of a method, the presence of a first access point in a radio environment is determined and the signal propagation characteristics of one or more existing access points in the radio environment are also determined. The signal propagation characteristics are represented by respective radio models of the one or more existing access points. The method also includes estimating the radio model of the first access point based at least upon the signal propagation characteristics of the one or more existing access points in the radio environment as represented by the respective radio models of the one or more existing access points.

17 Claims, 4 Drawing Sheets

(51) Int. Cl.
*H04W 24/08* (2009.01)
*H04W 64/00* (2009.01)

(58) Field of Classification Search
CPC . H04W 40/244; H04W 56/00; H04W 16/225; H04W 36/245; H04W 12/63; H04W 36/0083; H04W 56/0015; H04W 12/79; H04W 36/00835; H04W 56/001; H04W 88/085; H04W 36/165; H04W 88/12; H04W 92/20; H04W 28/021; H04W 4/00; H04W 40/20; H04W 72/0426; H04W 16/00; H04W 24/08; H04W 64/003; H04B 17/391; H04B 17/3913; H04B 17/309; H04L 43/12
See application file for complete search history.

(56) References Cited

U.S. PATENT DOCUMENTS

| | | | |
|---|---|---|---|
| 10,383,086 B2 | 8/2019 | Chan et al. | |
| 2005/0245252 A1* | 11/2005 | Kappes | H04W 16/18 455/446 |
| 2008/0039114 A1* | 2/2008 | Phatak | G01S 5/0252 455/456.1 |
| 2013/0035109 A1* | 2/2013 | Tsruya | G01S 5/0252 455/456.1 |
| 2014/0349671 A1* | 11/2014 | Lakhzouri | G01S 5/0278 455/456.1 |
| 2015/0373567 A1* | 12/2015 | Kish | H04W 16/20 370/252 |
| 2017/0343639 A1* | 11/2017 | Ivanov | H04W 4/33 |
| 2020/0329452 A1* | 10/2020 | Zhang | H04W 8/02 |

OTHER PUBLICATIONS

Extended European Search Report for European Application No. 21204465.5 dated Mar. 17, 2022, 8 pages.

* cited by examiner

METHOD AND APPARATUS FOR ACCELERATING ESTIMATION OF A RADIO MODEL OF AN ACCESS POINT

TECHNOLOGICAL FIELD

A method, apparatus and computer program product are provided in accordance with an example embodiment in order to estimate the radio model of an access point and, more particularly, to accelerate the estimation of the radio model of an access point, e.g., a newly deployed access point, based upon respective radio models of one or more existing access points within the same radio environment.

BACKGROUND

Various positioning systems have been developed for determining the position of a mobile device, such as a smart phone or other types of user equipment. At least some of these positioning systems utilize radio models of wireless access points that, in turn, are based on probe points that have been collected by a plurality of mobile devices. The wireless access points may be part of a cellular system, such as a Global System for Mobile communications (GSM) system, a wideband code division multiple access (WCDMA) system, a time division synchronous code division system multiple access (TD-SCDMA) system, a Long Term Evolution (LTE) system, a Long Term Evolution Advanced (LTE-A) system, a code division multiple access (CDMA) system, a NarrowBand-Internet of Things (NB-IoT) system, etc. or a non-cellular system, such as a Wireless Local Area Network (WLAN) system, a BLUETOOTH® (BT) system, a BLUETOOTH® Low Energy (BTLE) system, a ZIGBEE system or a long range (LoRa) system.

In relation to the radio models of wireless access points that are utilized by positioning systems, databases containing information regarding the radio signals received by mobile devices at different locations relative to the access points are created. The databases are typically formed of data provided by the mobile devices in the form of probe points that serve as radio fingerprints. Each probe point includes an estimate of the location of the mobile device at the time at which the radio signals were captured and a measurement of the radio signals that were captured. With respect to cellular signals, the measurement of the cellular signals may include an identification of the access point, that is, the cellular network cell, e.g., base station, that is transmitting the cellular signals that are received by the mobile device, such as a global and/or local identifier (ID) of the cellular network cell. The measurement of the cellular signals may also include a measurement of the signal strength and/or an estimate of the path loss as well as a timing measurement, such as a Timing Advance measurement or a Round-Trip Time measurement. With respect to the measurement of a non-cellular signal, the measurement may include an identification of the access point generating the non-cellular signals that are received by the mobile device, such as the basic service set identifiers (BSSIDs), e.g., a media access control (MAC) address of the air interface of an access point, e.g., a WLAN access point, or the service set identifier (SSID) or network name of the access point, e.g., WLAN access point. The measurement of a non-cellular signal also includes a measure of the signal strength, such as the received signal strength, the Rx level, etc. and/or a path loss estimate. In some embodiments, the measurement of a non-cellular signal also includes a timing measurement, such as the Round-Trip Time measurement.

The data, such as the probe points, collected by the plurality of mobile devices is generally uploaded, such as to a server or the cloud. By reference to the data, the positioning system then generates or updates radio models of the wireless access points that define the signal characteristics of radio signals that are transmitted by the wireless access points and received by mobile devices at different respective locations. The radio model may then be utilized for positioning purposes, that is, to determine the location of a mobile device based upon radio signals received by the mobile device at the respective location. Various radio models may be constructed including radio models based upon the coverage areas of the access points, radio models based upon the positions of the access points, radio propagation models, radio models based upon the Rx fields of the access points or the like. The resulting radio models may be stored by one or more network entities, such as by the positioning system, and/or may be transferred to one or more of the mobile devices.

The radio models may then be utilized to determine the position of a mobile device. For example, while a mobile device is at an unknown location, the mobile device may capture measurements of the cellular or non-cellular signals transmitted by the access points. By reference to the radio models that have been constructed, the measurements of the radio signals may be evaluated and the location of the mobile terminal may be determined, such as based upon the coverage areas of the access points.

At least some radio environments change over time as access points are added, moved, e.g., relocated, or removed. In a non-cellular environment, for example, it may not be uncommon for access points, such as WLAN access points, to be added or removed from the radio environment. These changes in the radio environment brought about by the addition, movement or removal of an access point alter the resulting radio models that are present within the radio environment. For example, the addition of an access point adds a further radio model to the radio environment and the movement of an access point changes an existing radio model within the radio environment. In order to ensure that the radio models can be utilized in an accurate manner, such as to determine the position of a mobile terminal within the radio environment, the radio models must be redefined or updated as access points are added, moved or removed within the radio environment since the radio model database otherwise becomes out of date.

The creation of a new radio model for an access point that is added to a radio environment or the updating of a radio model for an access point that is moved within the radio environment may take some time in order to accumulate sufficient probe points from the respective access points such that the radio model can be accurately defined or updated. During this period of time during which the radio model for the access point that has been added or moved is being defined or updated, the radio models that are utilized to determine the position of a mobile terminal may be outdated, such as in an instance in which an access point has moved or been relocated, or incomplete, such as in an instance in which an access point has been added to the radio environment. In any event, the utilization of the radio models of the access points within the radio environment may not yield results that are as accurate as may be desired in an instance in which a radio model is being newly defined or updated, thereby potentially leading to a reduction in confidence in the resulting positions determinations.

BRIEF SUMMARY

A method, apparatus and computer program product are provided in accordance with an example embodiment in order to accelerate the estimation of the radio model of an access point within a radio environment, such as an access point that has been newly added to the radio environment or an access point that is been moved or relocated within the radio environment. By utilizing the radio models of other access points within the radio environment for purposes of estimating the radio model of the access point that has been newly added to or has been relocated within the radio environment, the radio model that is estimated in accordance with an example embodiment may not only be quickly defined, but may be defined with enhanced accuracy relative to radio models that are defined on the basis of only a few probe points. Thus, the radio model that is estimated by the method, apparatus and computer program product of an example embodiment may be utilized to reliably determine the position of a mobile terminal within the radio environment.

In an example embodiment, a method is provided for accelerating estimation of a radio model of a first access point. The method includes determining a presence of the first access point in a radio environment and determining signal propagation characteristics of one or more existing access points in the radio environment as represented by respective radio models of the one or more existing access points. The method further includes estimating the radio model of the first access point based at least upon the signal propagation characteristics of the one or more existing access points in the radio environment as represented by the respective radio models of the one or more existing access points.

In relation to the estimation of the radio model of the first access point based at least upon the signal propagation characteristics of the one or more existing access points, the method of an example embodiment estimates the radio model of the first access point based upon at least one of a size or shape of the respective radio models of the one or more existing access points. In an embodiment in which there is an obstacle to signal propagation within the radio environment, the method may estimate the radio model of the first access point based upon at least a shape of the respective radio models of the one or more existing access points relative to the obstacle within the radio environment. In this example embodiment, the method may also include determining one or more of presence or characteristics of the obstacle based on signal propagation characteristics of respective radio models of the one or more existing access points. As such, the method of this example embodiment may estimate the radio model of the first access point based on one or more of the determined presence or characteristics of the obstacle.

The method of an example embodiment estimates the radio model of the first access point by weighting contributions of the respective radio models of the one or more existing access points to estimation of the radio model of the first access point. The weighting is based upon one or more of a number of probe points that have been collected for respective ones of the existing access points, a time elapsed since the probe points have been collected for respective ones of the existing access points or a degree of similarity between the respective radio models of the existing access points. In an example embodiment, the method estimates the radio model of the first access point by weighting contributions of the respective radio models of the one or more existing access points to estimation of the radio model of the first access point based upon relative positions of the first access point and the one or more existing access points to an obstacle within the radio environment. The obstacle is an obstacle to signal propagation within the radio environment. The method of this example embodiment may weight contributions of the respective radio models of the one or more existing access points to the estimation of the radio model of the first access point based upon information regarding respective positions of the first access point and the one or more existing access points and information regarding a position and orientation of the obstacle to signal propagation within the radio environment.

The method of an example embodiment also includes receiving one or more probe points for the first access point following estimation of the radio model of the first access point. In this example embodiment, the estimation of the radio model of the first access point is further based on the received one or more probe points for the first access point. In an example embodiment, the method also includes updating the respective radio model of at least one of the one or more existing access points following estimation of the radio model of the first access point based at least upon the signal propagation characteristics of the one or more existing access points. The method of this example embodiment also includes determining whether to update the radio model of the first access point based upon the respective radio model, following the updating, based upon a number of probe points that have been collected for the first access point.

The method of an example embodiment also includes determining a location of a mobile device at least partially based upon an estimation of the radio model of the first access point. The method of this example embodiment determines the location of the mobile device by weighting a contribution of the estimation of the radio model of the first access point based upon a number of probe points that have been collected for the first access point. In an example embodiment, the method determines the presence of the first access point in the radio environment by determining the presence of the first access point that has been added to the radio environment following estimation of the respective radio models of the one or more existing access points.

In another example embodiment, an apparatus is provided that is configured to accelerate estimation of a radio model of a first access point. The apparatus includes processing circuitry and at least one memory including computer program code instructions with the computer program code instructions configured to, when executed by the processing circuitry, cause the apparatus to determine a presence of the first access point in a radio environment. The computer program code instructions are also configured to, when executed by the processing circuitry, cause the apparatus to determine signal propagation characteristics of one or more existing access points in the radio environment as represented by respective radio models of the one or more existing access points. The computer program code instructions are further configured to, when executed by the processing circuitry, cause the apparatus to estimate the radio model of the first access point based at least upon the signal propagation characteristics of the one or more existing access points in the radio environment as represented by the respective radio models of the one or more existing access points.

In relation to the estimation of the radio model of the first access point based at least upon the signal propagation characteristics of the one or more existing access points, the computer program code instructions are configured to, when executed by the processing circuitry, cause the apparatus of an example embodiment to estimate the radio model of the first access point based upon at least one of a size or shape of the respective radio models of the one or more existing access points. In an embodiment in which there is an obstacle to signal propagation within the radio environment, the computer program code instructions are configured to, when executed by the processing circuitry, cause the apparatus to estimate the radio model of the first access point based upon at least a shape of the respective radio models of the one or more existing access points relative to the obstacle within the radio environment. In this example embodiment, the computer program code instructions may be further configured to, when executed by the processing circuitry, cause the apparatus to determine one or more of presence or characteristics of the obstacle based on signal propagation characteristics of respective radio models of the one or more existing access points. As such, the computer program code instructions may be configured to, when executed by the processing circuitry, cause the apparatus of this example embodiment to estimate the radio model of the first access point based on one or more of the determined presence or characteristics of the obstacle.

The computer program code instructions are configured to, when executed by the processing circuitry, cause the apparatus of an example embodiment to estimate the radio model of the first access point by weighting contributions of the respective radio models of the one or more existing access points to estimation of the radio model of the first access point. The weighting is based upon one or more of a number of probe points that have been collected for respective ones of the existing access points, a time elapsed since the probe points have been collected for respective ones of the existing access points or a degree of similarity between the respective radio models of the existing access points. In an example embodiment, the computer program code instructions are configured to, when executed by the processing circuitry, cause the apparatus to estimate the radio model of the first access point by weighting contributions of the respective radio models of the one or more existing access points to estimation of the radio model of the first access point based upon relative positions of the first access point and the one or more existing access points to an obstacle within the radio environment. The obstacle is an obstacle to signal propagation within the radio environment. The computer program code instructions may be further configured to, when executed by the processing circuitry, cause the apparatus of this example embodiment to weight contributions of the respective radio models of the one or more existing access points to the estimation of the radio model of the first access point based upon information regarding respective positions of the first access point and the one or more existing access points and information regarding a position and orientation of the obstacle to signal propagation within the radio environment.

The computer program code instructions are further configured to, when executed by the processing circuitry, cause the apparatus of an example embodiment to receive one or more probe points for the first access point following estimation of the radio model of the first access point. In this example embodiment, the estimation of the radio model of the first access point is further based on the received one or more probe points for the first access point. In an example embodiment, the computer program code instructions are further configured to, when executed by the processing circuitry, cause the apparatus to update the respective radio model of at least one of the one or more existing access points following estimation of the radio model of the first access point based at least upon the signal propagation characteristics of the one or more existing access points. The computer program code instructions are further configured to, when executed by the processing circuitry, cause the apparatus of this example embodiment to determine whether to update the radio model of the first access point based upon the respective radio model, following the updating, based upon a number of probe points that have been collected for the first access point.

The computer program code instructions are further configured to, when executed by the processing circuitry, cause the apparatus of an example embodiment to determine a location of a mobile device at least partially based upon an estimation of the radio model of the first access point. The computer program code instructions are configured to, when executed by the processing circuitry, cause the apparatus of this example embodiment to determine the location of the mobile device by weighting a contribution of the estimation of the radio model of the first access point based upon a number of probe points that have been collected for the first access point. In an example embodiment, the computer program code instructions are further configured to, when executed by the processing circuitry, cause the apparatus to determine the presence of the first access point in the radio environment by determining the presence of the first access point that has been added to the radio environment following estimation of the respective radio models of the one or more existing access points.

In a further example embodiment, an apparatus is provided for accelerating estimation of a radio model of a first access point. The apparatus includes means for determining a presence of the first access point in a radio environment and means for determining signal propagation characteristics of one or more existing access points in the radio environment as represented by respective radio models of the one or more existing access points. The apparatus further includes means for estimating the radio model of the first access point based at least upon the signal propagation characteristics of the one or more existing access points in the radio environment as represented by the respective radio models of the one or more existing access points.

In relation to the estimation of the radio model of the first access point based at least upon the signal propagation characteristics of the one or more existing access points, the apparatus of an example embodiment includes means for estimating the radio model of the first access point based upon at least one of a size or shape of the respective radio models of the one or more existing access points. In an embodiment in which there is an obstacle to signal propagation within the radio environment, the apparatus may include means for estimating the radio model of the first access point based upon at least a shape of the respective radio models of the one or more existing access points relative to the obstacle within the radio environment. In this example embodiment, the apparatus may also include means for determining one or more of presence or characteristics of the obstacle based on signal propagation characteristics of respective radio models of the one or more existing access points. As such, the apparatus of this example embodiment may include means for estimating the radio model of the first access point based on one or more of the determined presence or characteristics of the obstacle.

The apparatus of an example embodiment includes means for estimating the radio model of the first access point by weighting contributions of the respective radio models of the one or more existing access points to estimation of the radio model of the first access point. The weighting is based upon one or more of a number of probe points that have been collected for respective ones of the existing access points, a time elapsed since the probe points have been collected for respective ones of the existing access points or a degree of similarity between the respective radio models of the existing access points. In an example embodiment, the means for estimating the radio model of the first access point includes means for weighting contributions of the respective radio models of the one or more existing access points to estimation of the radio model of the first access point based upon relative positions of the first access point and the one or more existing access points to an obstacle within the radio environment. The obstacle is an obstacle to signal propagation within the radio environment. The apparatus of this example embodiment may include means for weighting contributions of the respective radio models of the one or more existing access points to the estimation of the radio model of the first access point based upon information regarding respective positions of the first access point and the one or more existing access points and information regarding a position and orientation of the obstacle to signal propagation within the radio environment.

The apparatus of an example embodiment also includes means for receiving one or more probe points for the first access point following estimation of the radio model of the first access point. In this example embodiment, the estimation of the radio model of the first access point is further based on the received one or more probe points for the first access point. In an example embodiment, the apparatus also includes means for updating the respective radio model of at least one of the one or more existing access points following estimation of the radio model of the first access point based at least upon the signal propagation characteristics of the one or more existing access points. The apparatus of this example embodiment also includes means for determining whether to update the radio model of the first access point based upon the respective radio model, following the updating, based upon a number of probe points that have been collected for the first access point.

The apparatus of an example embodiment also includes means for determining a location of a mobile device at least partially based upon an estimation of the radio model of the first access point. In this example embodiment, the means for determining the location of the mobile device includes means for weighting a contribution of the estimation of the radio model of the first access point based upon a number of probe points that have been collected for the first access point. In an example embodiment, the means for determining the presence of the first access point in the radio environment includes means for determining the presence of the first access point that has been added to the radio environment following estimation of the respective radio models of the one or more existing access points.

In yet another example embodiment, a computer program product is provided that is configured to accelerate estimation of a radio model of a first access point. The computer program product includes at least one non-transitory computer-readable storage medium having computer-executable program code instructions stored therein with the computer-executable program code instructions including program code instructions to determine a presence of the first access point in a radio environment. The computer-executable program code instructions also include program code instructions to determine signal propagation characteristics of one or more existing access points in the radio environment as represented by respective radio models of the one or more existing access points. The computer-executable program code instructions further include program code instructions configured to estimate the radio model of the first access point based at least upon the signal propagation characteristics of the one or more existing access points in the radio environment as represented by the respective radio models of the one or more existing access points.

The program code instructions configured to estimate the radio model of the first access point based at least upon the signal propagation characteristics of the one or more existing access points include, in accordance with an example embodiment, program code instructions configured to estimate the radio model of the first access point based upon at least one of a size or shape of the respective radio models of the one or more existing access points. In an example embodiment, the program code instructions configured to estimate the radio model of the first access point based at least upon the signal propagation characteristics of the one or more existing access points include program code instructions configured to estimate the radio model of the first access point based upon at least a shape of the respective radio models of the one or more existing access points relative to an obstacle within the radio environment. The obstacle is an obstacle to signal propagation within the radio environment. In this example embodiment, the computer-executable program code instructions may further include program code instructions to determine one or more of presence or characteristics of the obstacle based on signal propagation characteristics of respective radio models of the one or more existing access points. As such, the program code instructions of this example embodiment may be configured to estimate the radio model of the first access point based on one or more of the determined presence or characteristics of the obstacle.

The program code instructions configured to estimate the radio model of the first access point include, in an example embodiment, program code instructions configured to weight contributions of the respective radio models of the one or more existing access points to estimation of the radio model of the first access point. The weighting is based upon one or more of a number of probe points that have been collected for respective ones of the existing access points, a time elapsed since the probe points have been collected for respective ones of the existing access points or a degree of similarity between the respective radio models of the existing access points. In an example embodiment, the program code instructions configured to estimate the radio model of the first access point include program code instructions configured to weight contributions of the respective radio models of the one or more existing access points to estimation of the radio model of the first access point based upon relative positions of the first access point and the one or more existing access points to an obstacle within the radio environment. The obstacle is an obstacle to signal propagation within the radio environment. The program code instructions of this example embodiment may be configured to weight contributions of the respective radio models of the one or more existing access points to the estimation of the radio model of the first access point based upon information regarding respective positions of the first access point and the one or more existing access points and information regarding a position and orientation of the obstacle to signal propagation within the radio environment.

The computer-executable program code instructions of an example embodiment further include program code instructions configured to receive one or more probe points for the first access point following estimation of the radio model of the first access point. In this example embodiment, the estimation of the radio model of the first access point is further based on the received one or more probe points for the first access point. In an example embodiment, the computer-executable program code instructions further include program code instructions configured to update the respective radio model of at least one of the one or more existing access points following estimation of the radio model of the first access point based at least upon the signal propagation characteristics of the one or more existing access points. The computer-executable program code instructions of this example embodiment may also include program code instructions configured to determine whether to update the radio model of the first access point based upon the respective radio model, following the updating, based upon a number of probe points that have been collected for the first access point.

The computer-executable program code instructions of an example embodiment further include program code instructions configured to determine a location of a mobile device at least partially based upon an estimation of the radio model of the first access point. The program code instructions of this example embodiment are configured to determine the location of the mobile device by weighting a contribution of the estimation of the radio model of the first access point based upon a number of probe points that have been collected for the first access point. In an example embodiment, the program code instructions configured to determine the presence of the first access point in the radio environment include program code instructions configured to determine the presence of the first access point that has been added to the radio environment following estimation of the respective radio models of the one or more existing access points.

BRIEF DESCRIPTION OF THE DRAWINGS

Figure 1:
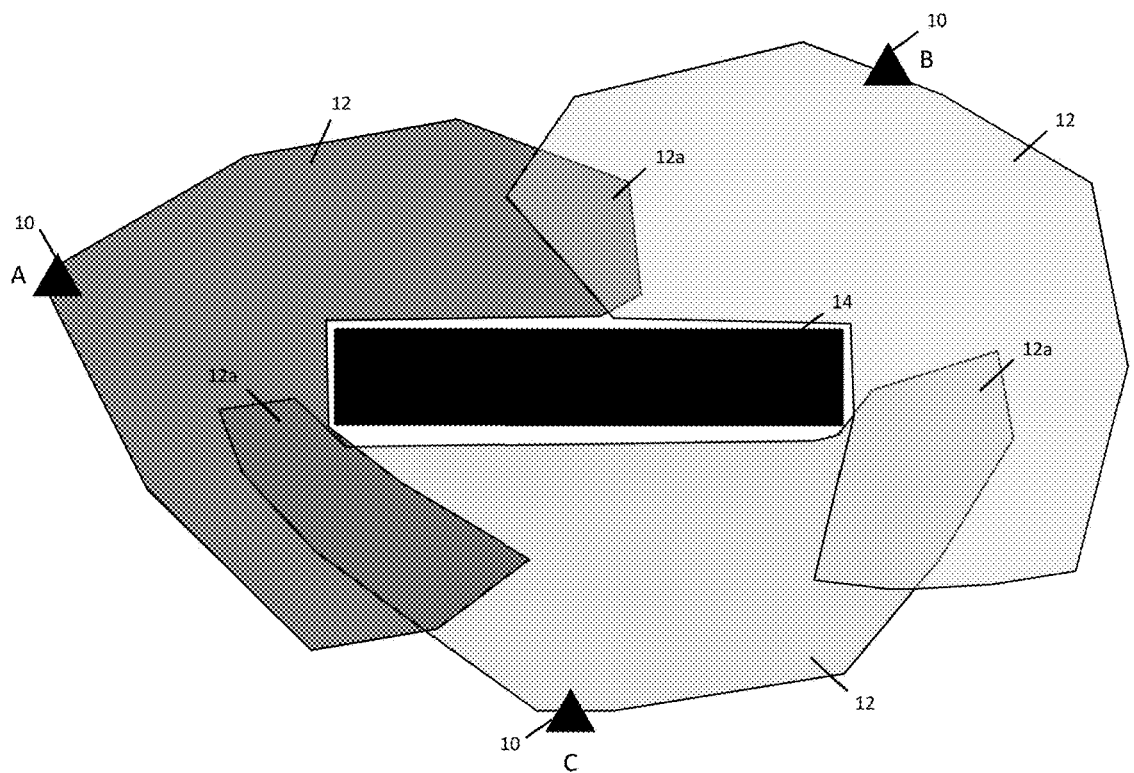
Figure 2:
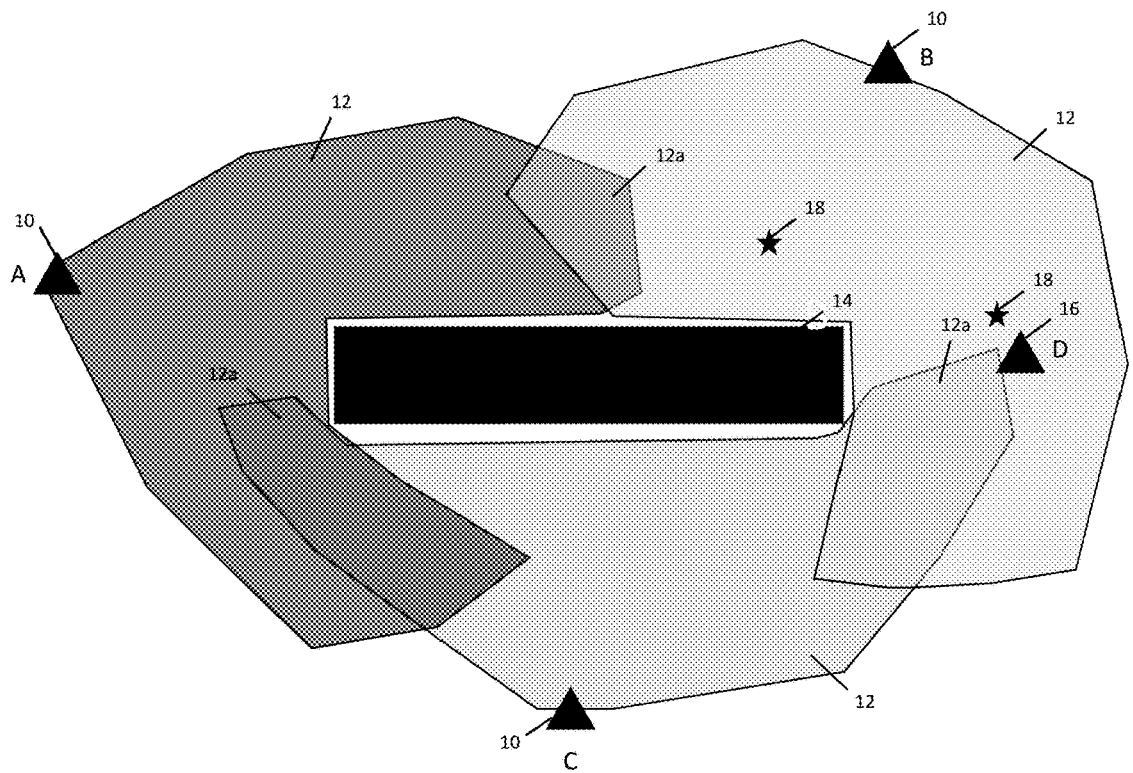
Figure 3:
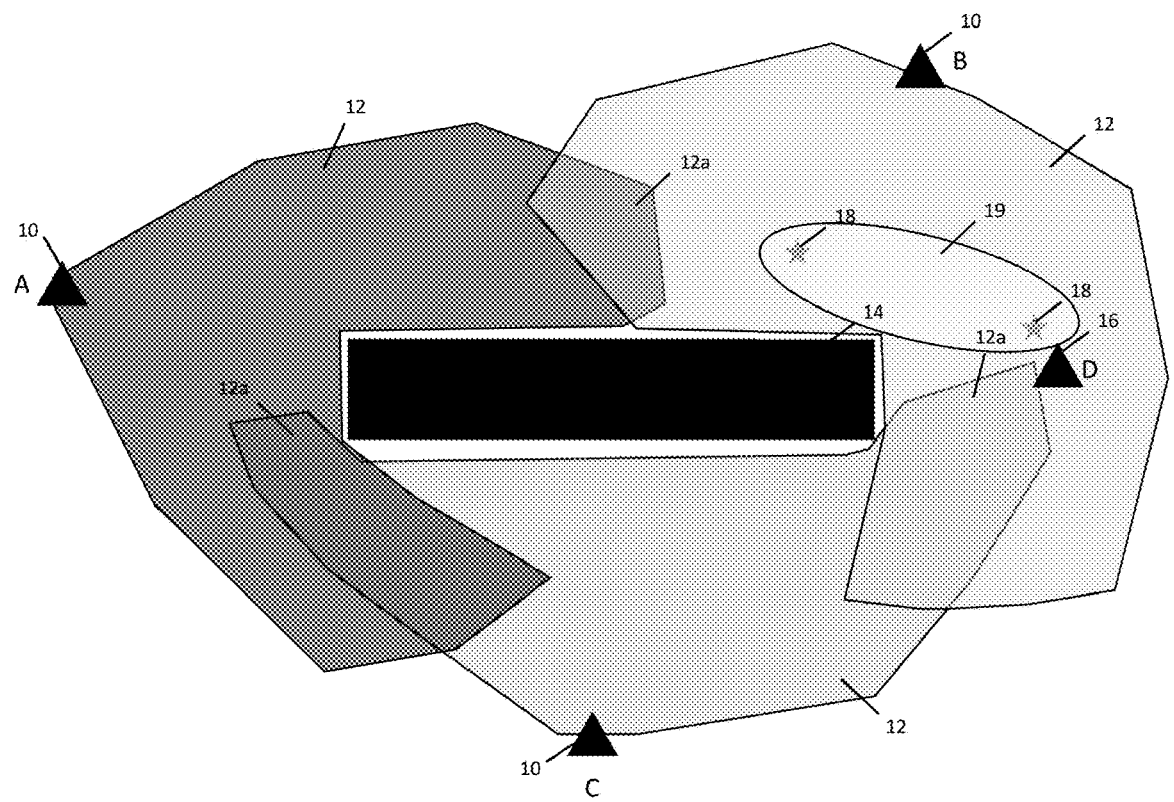
Figure 4:
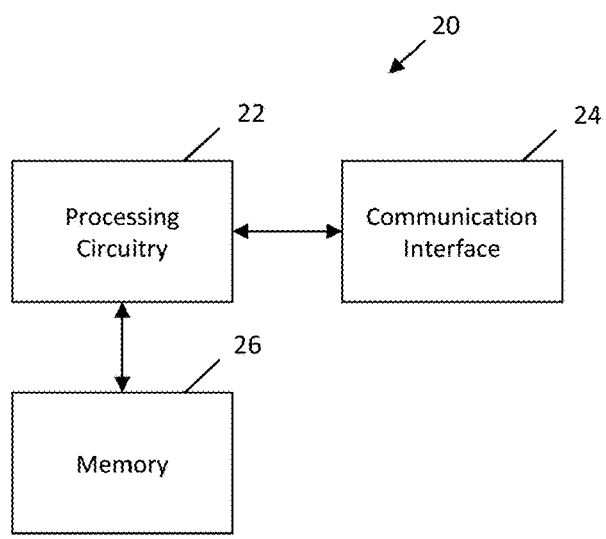
Figure 5:
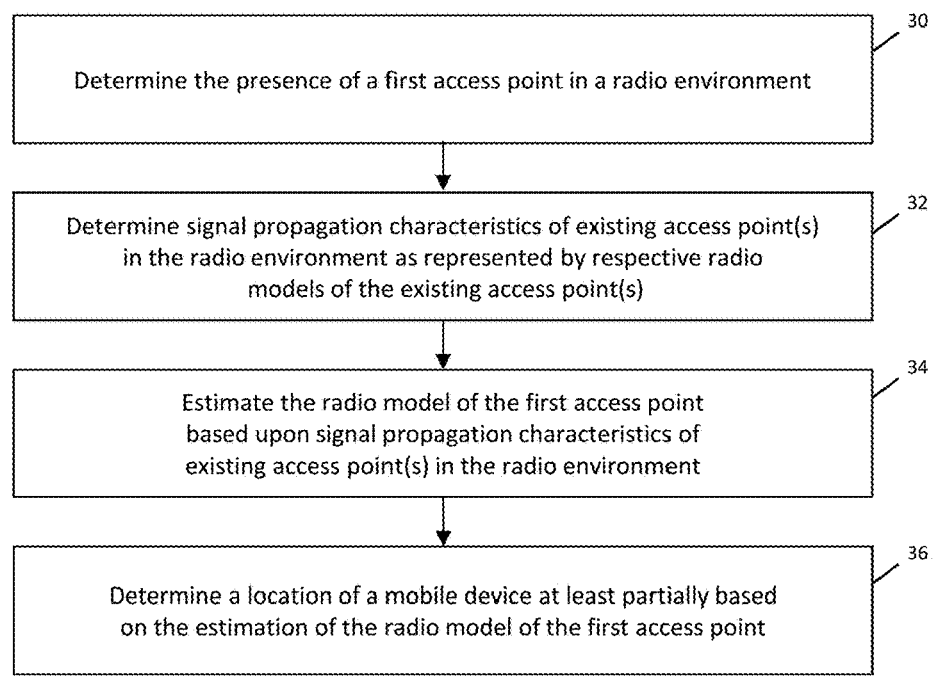
Figure 6:
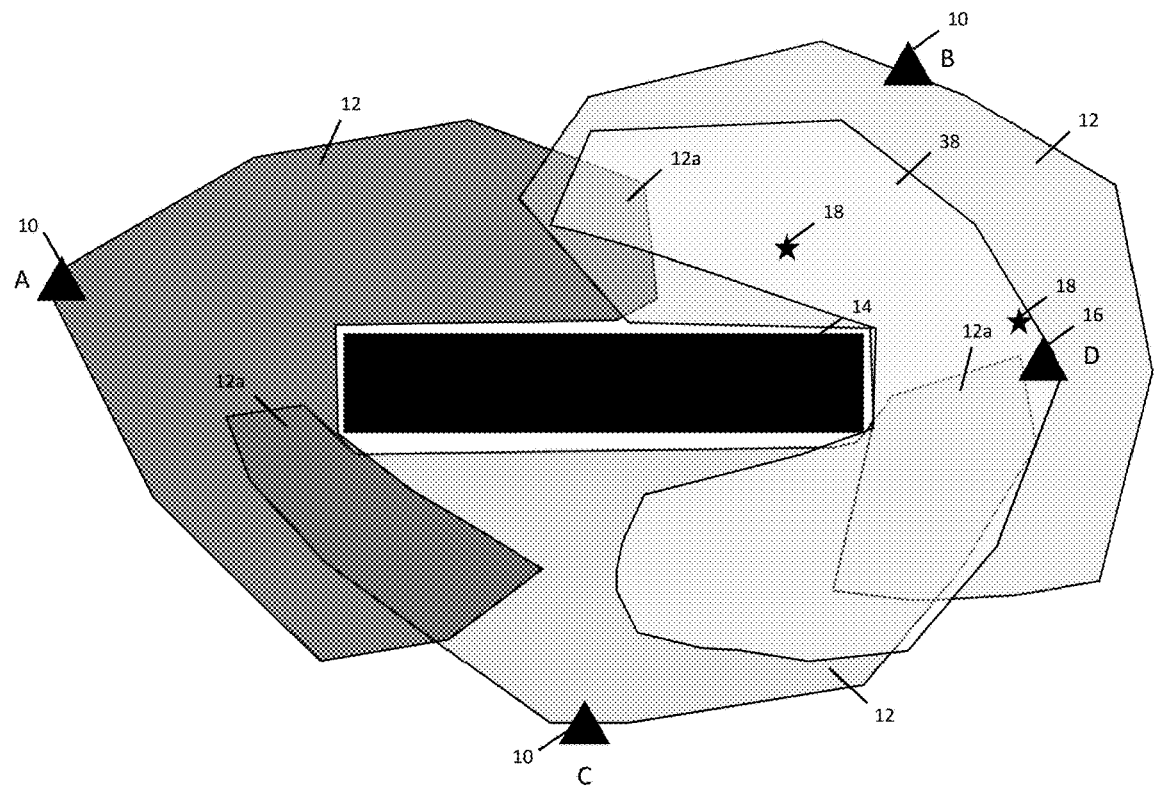
Figure 7:
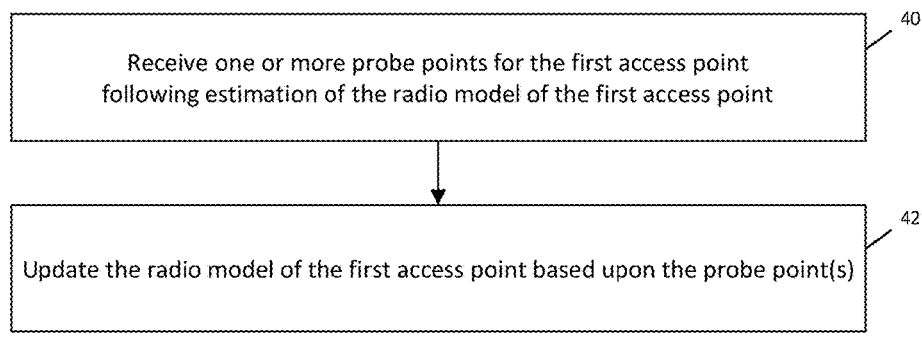
Figure 8:
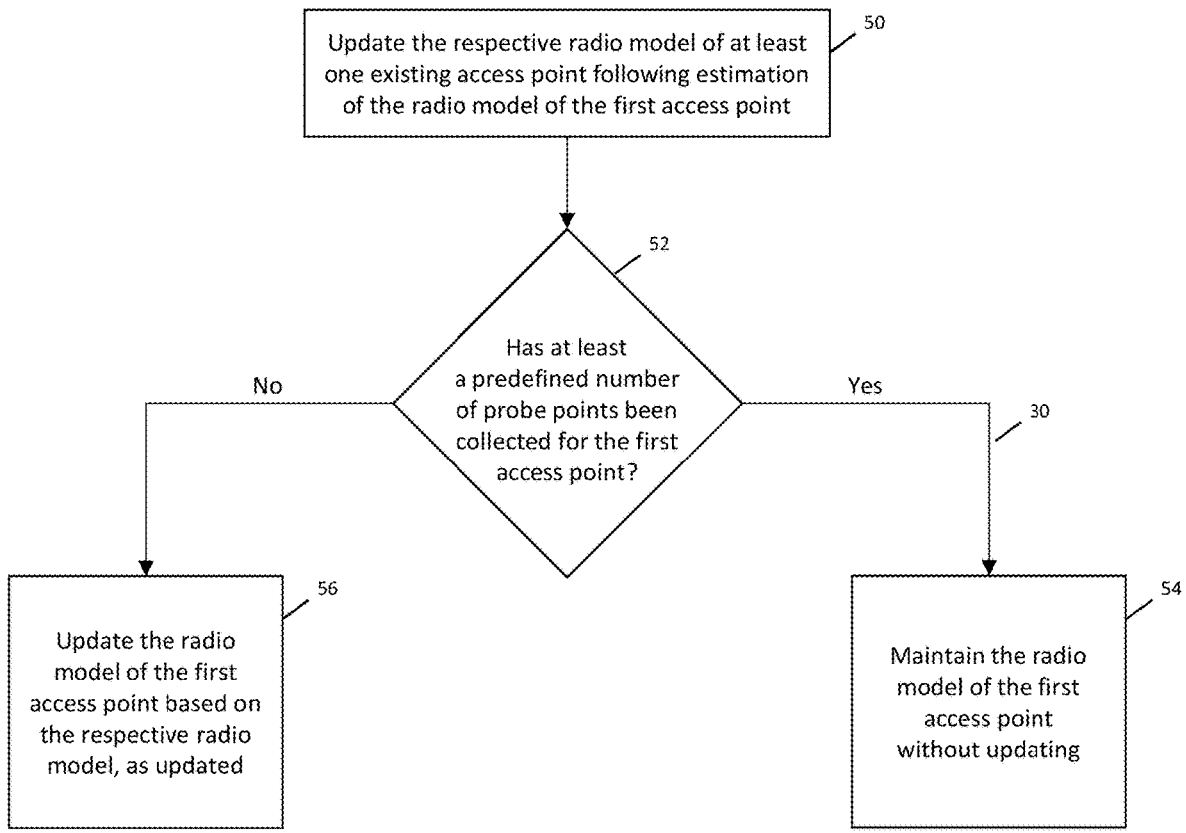

Having thus described certain embodiments of the present disclosure in general terms, reference will now be made to the accompanying drawings, which are not necessarily drawn to scale, and wherein:

FIG. 1 illustrates a radio environment having three access points and associated radio models that are shaped, at least in part, based upon an obstacle within the radio environment;

FIG. 2 also illustrates the radio environment of FIG. 1 following the introduction of a new access point;

FIG. 3 illustrates the radio environment of FIG. 2 and depicts an initial radio model of the new access point as defined based upon two probe points;

FIG. 4 is a block diagram of an apparatus that may be specifically configured in accordance with an example embodiment in order to accelerate the estimation of the radio model of an access point;

FIG. 5 is a new flow chart illustrating the operations performed, such as by the apparatus of FIG. 4, in accordance with an example embodiment;

FIG. 6 illustrates the radio environment of FIG. 1 following the addition of the radio model that has been estimated for the new access point in accordance with an example embodiment;

FIG. 7 is a flow chart illustrating the operations performed, such as by the apparatus of FIG. 4, in order to update the radio model of a new access point following the receipt of one or more additional probe points in accordance with an example embodiment; and FIG. 8 is a flow chart illustrating the operations performed, such as by the apparatus to FIG. 4, in order to determine in accordance with an example embodiment whether to update the radio model of a new access point following the updating of a respective radio model of an existing access point.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to accelerate the estimation of the radio model of an access point within a radio environment. The access point for which the radio model is estimated may be an access point that is newly added to the radio environment, that is, an access point that was not previously present within the radio environment and was not previously transmitting radio signals throughout the radio environment. Alternatively, the access point for which the radio model is estimated may be an access point that was previously part of the radio environment, such as by being previously present within the radio environment and transmitting radio signals throughout the radio environment, but that has been moved or relocated within the radio environment.

The access point for which the radio model is estimated may be an access point for a cellular-based radio environment, such as a base station, or for a non-cellular radio environment, such as a WLAN access point or other type of non-cellular access point. Additionally, the access point for which the radio model is estimated and the radio environment in which the access point is disposed may be outdoors, such as in an instance in which the access point is a base station of a cellular-based radio environment, or indoors, such as in an instance in which the access point is a WLAN access point or other type of non-cellular access point. By way of example, but not of limitation, the method, apparatus and computer program product of an example embodiment will hereinafter be described in conjunction with a radio environment that is indoors with the access point for which the radio model is estimated also being indoors, such as a WLAN access point or other non-cellular access point.

The radio environment into which the access is added or within which the access point is relocated also includes one or more existing access points that are configured to transmit radio signals throughout the radio environment and for which radio models have been defined. The access point for which a radio model is estimated in accordance with an example embodiment is added to the radio environment or is moved within the radio environment after the radio models of the existing access points have been defined, such as based on probe points collected for the existing access points. The access point for which a radio model is estimated and the existing access points may be the same type of access points, such as base stations or other cellular-based access points or a WLAN access point or other non-cellular access points.

By way of example, FIG. 1 depicts a radio environment that includes three existing access points 10 designated A, B and C. A radio model 12 has been defined for each of the existing access points. The radio models of the existing access points illustrate the region within which radio signals transmitted by a respective access point can be detected with at least predefined signal characteristics, such as at least a predefined signal strength. Outside of the region defined by the radio model for a respective access point, the radio signals transmitted by the respective access point are either not detected or, if detected, have signal characteristics that fail to satisfy the predefined signal characteristics, such as by having a signal strength that is less than a predefined threshold. While the radio models may be defined for the existing access points in various manners, the radio models for the existing access points may be defined, in one embodiment, based upon probe points that have been collected, such as by mobile devices within the radio environment, from the existing access points. In this regard, a mobile device may include any of a wide variety of mobile terminals such as a mobile telephone, a smart phone, a personal digital assistant (PDA), a personal navigation device, a smart watch, a tablet computer, or any combination of the aforementioned and other types of portable computer devices.

The radio environment of the illustrated embodiment includes an obstacle 14 that prevents or limits the otherwise uniform propagation of the radio signals transmitted by the existing access points 10 throughout the radio environment. The radio environment may include various types of obstacles that limit or otherwise alter the signal propagation of the radio signals transmitted by the existing access points. In an indoor setting, the obstacle may be a wall, a bank of elevators or other physical structures that prevent or limit the propagation of radio signals transmitted by the existing access points throughout the radio environment. In an outdoor setting, however, the obstacle may be any type of structure or other impediment to signal propagation throughout the radio environment. For example, while a wall or other physical structure may also serve as an obstacle within the outdoor setting, urban canyons may also serve as an obstacle by limiting the propagation of radio signals throughout the radio environment. While obstacles in the form of physical structures have been described by way of example, there may be other types of obstacles to the uniform propagation of radio signals, including sources of magnetic and/or electromagnetic signals that may interfere with the propagation of radio signals throughout the radio environment.

Referring now to FIG. 1, the radio models 12 of the existing access points 10 are shaped based at least in part upon the impediment to signal propagation introduced by the obstacle 14. For example, the radio model associated with the existing access point designated A has a generally C-shape with first and second arms that extend at least partially about opposite sides of the obstacle. The radio models of the other existing access points designated B and C are similarly shaped based at least in part upon the impediment to signal propagation introduced by the obstacle with the radio models extending at least partly about the opposite sides of the obstacle.

As shown in FIG. 1, the radio models 12 of the existing access points 10 may partially overlap with regions designated 12a. By utilizing the radio models of the existing access points, the location of a mobile device may be determined, such as based upon a radio coverage model. In this regard, a radio device that receives radio signals from the access points designated A and C may be determined to be within the region in which the radio models of access point A and access point C overlap.

As shown in FIG. 2, another access point 16 designated as D may be detected within the radio environment. In this regard, the other access point may be a new access point that was not previously located within the radio environment and, as such, did not previously transmit radio signals throughout the radio environment. Alternatively, the other access point that is now detected may have been one of the existing access points that has moved or been relocated and, as a result, now has a different radio model associated therewith since the radio signals are being transmitted from a different location within the radio environment. By way of example, FIG. 2 depicts a scenario in which another access point that is new to the radio environment is detected. In the illustrated embodiment, the access point that is new to the radio environment is detected by the collection of probe points 18, such as by a mobile device, with the probe points providing information regarding the radio signals transmitted by the new access point within the radio environment. Since the probe points that are collected are representative of radio signals transmitted by an access point that was not previously in the radio environment, the presence of a new and different access point is detected.

As shown in FIG. 3, a radio model 19 may be generated for the access point 16 that is new to the radio environment or that has been repositioned within the radio environment based upon the probe points 18 that have been collected for the access point. For a period of time following the initial introduction of the new access point, however, only a few probe points may have been collected for the new access point, such as the two probe points depicted in FIG. 2. Although a radio model may be constructed based upon the relatively few number of probe points, such as the radio model constructed based upon the two probe point for the new access point depicted in FIG. 3, the radio model and, in particular, the size, shape and other characteristics of the radio model may be less accurate than is desired due to the limited amount of data, such as the limited number of probe points, upon which the radio model is based. With respect to the example of FIG. 3, the radio model that is constructed based upon the two probe points that have been collected for the new access point designated as access point D has an elliptical shape that extends to a limited degree on one side of the obstacle 14. This radio model is likely inaccurate, however, as additional probe points have not yet been collected from other locations relative to the obstacle, such as from locations on the other side of the obstacle, or from other locations further removed from the new access point.

Based upon the resulting inaccuracies or other limitations of the radio model 19 that may be constructed based upon the limited number of probe points 18 that have been collected, subsequent use of the resulting radio model for the new access point 16 may correspondingly be inaccurate or imprecise. For example, the determination of the position of a mobile device based at least partly upon the radio model for a new access point that has been constructed based upon a limited number of probe points, such as shown in FIG. 3, may also be inaccurate or imprecise due to the limitations imposed upon the radio model for the new access point.

In order to increase the accuracy of a resulting radio model 19 that is estimated for a new access point 16, such as an access point that has not previously been present within the radio environment or that has moved within the radio environment, and to accelerate the estimation of the radio model of the new access point, such as by estimating the radio model soon after the new access point has entered the radio environment, such as prior to the collection of a substantial number of probe points for the new access point, a method, apparatus and computer program product are provided. The apparatus that is configured to accelerate the estimation of the radio model for a new access point may be embodied by any of a variety of different types of computing devices, such as a positioning system, a server, a cloud computing device, a computer workstation, a distributed network of computing devices, a personal computer or any other type of computing device.

Regardless of the type of computing device that embodies the apparatus, the apparatus 20 of an example embodiment depicted in FIG. 4 includes, is associated with or is otherwise in communication with processing circuitry 22, memory 24 and communication interface 26. In some embodiments, the processing circuitry (and/or co-processors or any other processors assisting or otherwise associated with the processing circuitry) can be in communication with the memory via a bus for passing information among components of the apparatus. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally or alternatively, the memory can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. Additionally or alternatively, the processing circuitry can include one or more processors configured in tandem via the bus.

In an example embodiment, the processing circuitry 22 can be configured to execute instructions stored in the memory 24 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a mobile device, a server or other computing device of a positioning system or other network entity) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 20 of an example embodiment can also include the communication interface 26 that can be any means such as a device or circuitry embodied in either hardware or a combination of hardware and software that is configured to receive and/or transmit data from/to other electronic devices in communication with the apparatus, such as a database which, in one embodiment, stores a radio map generated and/or employed by the processing circuitry 22. The communication interface may be configured to support communication, for example, between one or more mobile devices, a positioning system and/or one or more other network entities. In an embodiment in which the apparatus is embodied by a mobile device, the communication interface may also be configured to communicate in accordance with various wireless protocols including communication with one or more wireless communication nodes of a cellular system and/or a non-cellular system. The communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

Referring now to FIG. 5, the operations performed, such as by the apparatus 20 of FIG. 4, in accordance with an example embodiment are depicted. As shown in block 30, the apparatus includes means, such as the processing circuitry 22, the communication interface 26 or the like, for detecting the presence of a first access point in a radio environment. In this regard, the first access point is an access point that is new to the radio environment or that has relocated to a new position within the radio environment. The presence of the first access point may be determined in various manners. In an example embodiment, however, the presence of the first access point may be determined based on one or more probe points that are associated with the first access point. In this regard, the one or more probe points may be received, such as via the communication interface, and determined, such as by the processing circuitry, to be representative of radio signals transmitted by the first access point and detected by a mobile device within the radio environment.

With reference to the example depicted in FIG. 2, the probe points 18 representative of radio signals transmitted by the access point 16 designated D may be utilized to determine the presence of a new access point to the radio environment. In this regard, the probe points may be associated with an access point that was not previously detected to be within the radio environment in the case of a new access point. Alternatively, the probe points may be detected by a mobile device to be within a portion of the radio environment that was outside of the radio model of an existing access point, such as in the case in which the access point that had been relocated within the radio environment.

As shown in block 32, the apparatus 20 also includes means, such as the processing circuitry 22 or the like, configured to determine the signal propagation characteristics of one or more existing access points 10 in the radio environment. In an example embodiment, the signal propagation characteristics of the one or more existing access points are represented by respective radio models 12. These radio models may be stored by the memory 24 or by a database or other memory device and may be accessed by the processing circuitry. A radio model may define various signal propagation characteristics including the presence (or absence) of signals transmitted by a respective access point that have at least a predefined signal strength at one or more locations. Alternatively, the radio model may define the signal strength of the signals transmitted by a respective access point at one or more locations. Other radio models may include additional or different signal propagation characteristics, at least some of which are associated with one or more locations within the radio environment.

As shown in block 34, the apparatus 20 also includes means, such as the processing circuitry 22 or the like, configured to estimate the radio model of the first access point 16 based upon the signal propagation characteristics of one or more existing access points 10 in the radio environment. As described above, the signal propagation characteristics of the one or more existing access points may be represented by respective radio models 12. With respect to the example described above, the radio model 38 of the new access point designated D may be estimated based upon the signal propagation characteristics of the existing access points designated A, B and C within the radio environment, such as depicted in FIG. 6. In this regard, the radio model of the new access point of FIG. 6 is much more comparable to the radio models of the existing access points in the same radio environment than the radio model 19 that would otherwise be constructed based upon a limited number of initial probe points 18, such as described above and shown in FIG. 3. As such, the radio model that is estimated for the new access point in accordance with an example embodiment can more accurately represent the signal propagation characteristics of the radio signals transmitted by the first access point. Additionally, the radio model may be estimated in accordance with an example embodiment relatively soon after having determined in the presence of the first access point without awaiting the collection of a more substantial number of probe points from the first access point.

The apparatus 20, such as the processing circuitry 22, may be configured to estimate the radio model of the first access point 16 in various manners. In an example embodiment, the apparatus, such as the processing circuitry, is configured to estimate the radio model 38 of the first access point based upon the size and/or the shape of the respective radio models 12 of the existing access points 10. In this regard, the apparatus, such as the processing circuitry, is configured to estimate the size of the radio model of the first access point to be the same or to be approximately equal to the size of the radio models of the existing access points. Additionally or alternatively, the apparatus, such as the processing circuitry, is configured to estimate the shape of the radio model of the first access point to have the same or a similar shape as the shape of the radio models of the exiting access points.

In an instance in which an obstacle 14 is located within the radio environment, the apparatus 20, such as the processing circuitry 22, of an example embodiment is configured to estimate the radio model 38 of the first access point 16 based upon at least the shape of the respective radio models 12 of the existing access points 10 relative to the obstacle. In this regard, the apparatus, such as the processing circuitry, is configured to estimate the shape of the radio model of the first access point to have the same or similar shape relative to the obstacle within the radio environment as the shape that the respective radio models of the existing access points have relative to the obstacle. With respect to the example of FIG. 1, the generally C-shape of the radio models of the existing access points having opposed arms that extend at least partly about opposite sides of the obstacle may be utilized by the apparatus, such as the processing circuitry, of an example embodiment to estimate the shape of the radio model of the first access point to similarly have a C-shape with opposed arms that extend at least partly about the opposite sides of the obstacle.

In this example embodiment, the apparatus 20 may also include means, such as the processing circuitry 22 or the like, configured to determine the presence of the obstacle 14 and/or characteristics of the obstacle, such as the location, size and/or shape of the obstacle, based on signal propagation characteristics of respective radio models 12 of the one or more existing access points 10. As such, the apparatus, such as the processing circuitry, of this example embodiment is configured to estimate the radio model 38 of the first access point 16 based upon signal propagation characteristics of one or more existing access points by estimating the radio model of the first access point based on the determined presence of the obstacle and/or characteristics of the obstacle.

In an instance in which the radio environment includes a plurality of existing access points 10 having respective radio models 12, the radio model of each of the existing access points may be considered equally in relation to the estimation of the radio model 38 of the first access point 16 that is newly present or newly located within the radio environment. However, in some example embodiments, the apparatus 20 includes means, such as the processing circuitry 22 or the like, configured to differently weight the contributions of the respective radio models of the one or more existing access points to the estimation of the radio model of the first access point based upon one or more weighting factors. In one example embodiment, the weighting factors include the confidence associated with the radio models of the existing access points. In this regard, the contribution of a respective radio model of an existing access point to the estimation of the radio model of the first access point may be weighted in a manner that has a direct relationship, such as a proportional relationship, to the confidence associated with the respective radio model of existing access point.

In this example embodiment, the confidence associated with the radio models 12 of the existing access points 10 may be based upon the number of probe points that have been collected for the existing access points. Thus, a weighting factor of this example embodiment includes the number of probe points that have been collected for respective ones of the existing access points. By way of example, the contribution of a respective radio model of an existing access point to the estimation of the radio model 38 of the first access point 16 may be weighted in a manner that has a direct relationship, such as a proportional relationship, to the number of probe points that have been collected for the respective existing access point. Thus, the contribution of the respective radio model of an existing access point is weighted more heavily in an instance in which a large number of probe points have been collected for the respective access point than in an instance in which only a few number of probe points have been collected for the existing access point. The radio model of an existing access point for which a large number of probe points have been collected will therefore have a greater contribution to the estimation of the radio model of the first access point than the radio model of an existing access point for which only a few probe points have been collected.

The confidence associated with the radio models 12 of the existing access points 10 may additionally or alternatively be based upon the time elapsed since the probe points have been collected for respective ones of the existing access points. Thus, another weighting factor that may be considered in addition to, or instead of, the number of probe points have been collected for respective ones of the existing access points is the time elapsed since the probe points have been collected for respective ones of the existing access points. By way of example, the contribution of a respective radio model of an existing access point to the estimation of the radio model 38 of the first access point 16 may be weighted in a manner that has an indirect relationship, such as an inversely proportional relationship, to the time elapsed since the probe points have been collected for respective ones of the existing access points. Thus, the contribution of the respective radio model of an existing access point is weighted more heavily in an instance in which at least some of the probe points have been recently collected such that the time elapsed since the most recent probe points have been collected is relatively small than in an instance in which no probe points have been collected for a longer period of time such that the time elapsed since the most recent probe points have been collected is relatively large. The radio model of an existing access point for which probe points have been collected more recently will therefore have a greater contribution to the estimation of the radio model of the first access point than the radio model of an existing access point for which no probe points have been collected for a longer period of time.

Yet another waiting factor weighting factor that may be considered in addition to or instead of the confidence associated with the radio models 12 of the existing access points 10 is the degree of similarity between the respective radio models of the existing access points. In this regard, the degree of similarity is a measure of the similarity between the shapes and sizes of the respective radio models of the existing access points. By way of example, the contribution of a respective radio model of an existing access point to the estimation of the radio model 38 of the first access point 16 may be weighted in a manner that has an direct relationship, such as a proportional relationship, to the similarity that the respective radio model of the existing access point has to the respective radio models of one or more other existing access points. Thus, the contribution of the respective radio model of an existing access point is weighted more heavily in an instance in which the respective radio model of the existing access point is similar in size and/or shape to the respective radio model(s) of one or more other existing access points than in an instance in which the respective radio model of the existing access point is dissimilar in both size and shape to the respective radio model(s) of all of the other existing access points. The radio model of an existing access point that is similar in size and/or shape to the respective radio model(s) of one or more other existing access points will therefore have a greater contribution to the estimation of the radio model of the first access point than the radio model of an existing access point that is dissimilar in size and shape to the radio models of all of the other existing access points.

In this example embodiment, the weighting may be further dependent upon the number of radio models 12 of the existing access points 10 that are similar in size and/or shape and/or the degree of similarity between the radio models of the existing access points. In this regard, the weighting may have a direct relationship, such as a proportional relationship, to the number of radio models of the existing access points that are similar in size and/or shape. Similarly, the weighting may have a direct relationship, such as a proportional relationship, to the degree of similarity between the radio models of the existing access points. The radio model of an existing access point that is similar in size and/or shape to the respective radio models of a larger number of other existing access points will therefore have a greater contribution to the estimation of the radio model 38 of the first access point 16 than the radio model of an existing access point that is similar in size and/or shape to the respective radio models of a smaller number of other existing access points. Also, the radio model of an existing access point that is more similar in size and/or shape to the respective radio model of another one of the other existing access points will additionally have a greater contribution to the estimation of the radio model of the first access point than the radio model of an existing access point that is less similar in size and/or shape to the respective radio models of the other existing access points.

An additional or alternative weighting factor may be the relative positions of the first access point 16 and the one or more existing access points 10 to an obstacle to 14 signal propagation within a radio environment, such as the relative positions with respect to a particular feature of the obstacle. In this example embodiment, the apparatus 20 includes means, such as the processing circuitry 22 or the like, configured to weight contributions of the respective radio models 12 of the one or more existing access points to the estimation of the radio model 38 of the first access point based upon the relative positions of the first access point and the one or more existing access points to the obstacle to signal propagation within the radio environment. In an instance in which the relative positions of the first access point and an existing access point are the same with respect to the obstacle, the apparatus, such as the processing circuitry, of this example embodiment is configured to more greatly weight the contribution of the respective radio model of the existing access point that has the same or a similar relative position to the obstacle to the estimation of the radio model of the first access point. In contrast, in an instance in which the relative positions of the first access point and an existing access point are different with respect to the obstacle, the apparatus, such as the processing circuitry, of this example embodiment is configured to give less weight to the contribution of the respective radio model of the existing access point that has a different relative position to the obstacle to the estimation of the radio model of the first access point. Thus, the weight given to the contribution of a respective radio model of an existing access point to the estimation of the radio model of the first access point may have a direct relationship, such as a proportional relationship, to positional similarity between the existing access point and the first access point relative to an obstacle within the radio environment.

With respect to the example of FIG. 6, a first access point 16 designated D has the same or a similar position with respect to the obstacle 14 as the existing access point 10 designated A. In this regard, the access points designated A and D are both positioned in general alignment with the longer dimension of the obstacle, such as by being positioned approximate the shorter sides of the obstacle, while the other existing access points designated B and C and have different relative positions with respect to the obstacle. As such, the radio model 38 of the existing access point designated A in this example embodiment may be weighted so as to contribute more greatly to the shape and size of the radio model 12 of the existing access point designated D than the radio models of the existing access points designated B and C. In this example embodiment, the apparatus 20, such as the processing circuitry 22, is configured to weight the contributions of the respective radio models of the one or more existing access points to the estimation of the radio model of the first access point based upon the information regarding respective positions of the first access point and then one or more existing access points as well as information regarding the position and orientation of the obstacle to signal propagation within the environment.

The resulting radio model 38 of the first access point 16, that is, the access point that is new to the radio environment or the access point that has been repositioned within the radio environment, may be utilized for a variety of different purposes. In an example embodiment, however, the estimate of the radio model of the first access point as well as the radio models 12 of the existing access points 10 may be utilized in order to determine the position of a mobile device within the radio environment, such as based upon the radio signals from the different access points that are received by the mobile device relative to the different radio models of the access points. In this regard, the position of the mobile device may be determined to be within a region in which the radio models that encompass the region correspond to the access points transmitting the radio signals that are received by the mobile device. In this example embodiment, the apparatus 20 optionally includes means, such as the processing circuitry 22 or the like, configured to determine the location of the mobile device at least partially based upon an estimation of the radio model of the first access point. See block 36 of FIG. 5. In this regard, the apparatus, such as the processing circuitry, may also be configured in some, but not all embodiments, to determine the location of the mobile device based upon the respective radio models of the one or more existing access points in addition to the estimation of the radio model of the first access point.

In an example embodiment, the contribution of the estimated radio model 38 of the first access point 16 may be weighted relative to the contributions of the respective radio models 12 of the existing access points 10 to the determination of the location of the mobile device based upon the number of probe points that have been collected for the first access point. In this regard, the apparatus 20, such as the processing circuitry 22, may be configured to weight the contribution of the estimated radio model of the first access point to the determination of the location of the mobile device in a manner that is directly dependent upon, such as by being proportional to, the number of probe points that have been collected for the first access point. Thus, in an instance in which only a few probe points have been collected for the first access point, the apparatus, such as the processing circuitry, may be configured to correspondingly apply a small weight to the contribution of the estimation of the radio model of the first access point to the determination of the position of a mobile device relative to the contributions of the radio models of the exiting access points since the estimation of the radio model of the first access point is based upon a smaller amount of real data. In contrast, the contribution of the estimation of the radio model of the first access point for which a larger number of probe points have been collected may be more greatly weighted in regard to the determination of the position of a mobile device relative to the contributions of the radio models of the exiting access points. In an example embodiment, the estimation of the radio model of the first access point for which at least a predefined number of access points have been collected may be equally weighted in regards to the determination of the location of the mobile device with the contributions of the radio models of the existing access points.

Once the radio model 38 of the first access point 16 has been initially estimated, the radio model of the first access point may again be estimated, such as by updating the initial estimate, as one or more additional probe points are subsequently collected for the first access point. As shown in block 40 of FIG. 7, the apparatus 20 of this example embodiment includes means, such as the processing circuitry 22, the communication interface 26 or the like, configured to receive one or more probe points for the first access point following estimation of the radio model of the first access point. As noted above, these probe points may be representative of information collected by a mobile device within the radio environment based upon radio signals transmitted by the first access point and received by the mobile device.

As shown in block 42 of FIG. 7, the apparatus 20 of this example embodiment may also include means, such as the processing circuitry 22 or the like, configured to update the radio model 38 of the first access point 16 based upon the one or more probe points. Thus, in an instance in which a probe point is collected for the first access point that is outside of the radio model that has been estimated for the first access point, the apparatus, such as the processing circuitry, may be configured to update the radio model so as to now include the region in which the probe point is located. As such, the accuracy of the radio model of the first access point may improve as one or more additional probe points are collected based upon radio signals transmitted by the first access point.

As shown in FIG. 8, the radio model 38 of the first access point 16 that has been estimated may also be updated based upon changes to, that is, updates to, the radio model 12 of an existing access point 10. As shown in block 50 of FIG. 8, the apparatus 20 of this embodiment includes means, such as the process and circuitry 22 or the like, configured to update the respective radio model of at least one of the one or more existing access points following estimation of the radio model of the first access point. The radio model of an existing access point may be updated for any of a variety of reasons including, for example, the collection of one or more additional probe points for the existing access point that lie outside of and cause updating of the respective radio model of the existing access point.

The apparatus 20 of this example embodiment also includes means, such as the processing circuitry 22 or the like, configured to determine whether to update the radio model 38 of the first access point 16 based upon an updated version of the respective radio model 12 of at least one of the one or more existing access points 10. In an example embodiment, the apparatus, such as the processing circuitry, is configured to determine whether to update the radio model of the first access point based upon the number of probe points that have been collected for the first access point. In this regard, in an instance in which fewer probe points have been collected for the first access point, the apparatus, such as the processing circuitry, will be more likely to update the radio model of first access point based upon updates to the radio model of an existing access point. Conversely, in an instance in which a larger number of probe points have been collected for the first access point, the apparatus, such as the processing circuitry, will be less likely to update the radio model of first access point based upon updates to the radio model of an existing access point.

In the illustrated embodiment and as shown in decision block 52 of FIG. 8, the apparatus 20, such as the processing circuitry 22, is configured to determine whether at least a predefined number of probe points have been collected for the first access point 16. In an instance in which at least the predetermined number of probe points have been collected for the first access point, the radio model 38 of the first access point is not modified or updated so as to take into account any update of the respective radio model 12 of at least one of the one or more existing access points 10. Thus, the apparatus of this example embodiment includes means, such as the processing circuitry, configured to maintain the radio model of the first access point without updating, as shown in block 54. Conversely, in an instance in which the number of probe points that have been collected for the first access point is less than the predetermined number of probe points, the apparatus, such as the processing circuitry, of this example embodiment is configured to update the radio model of the first access point based upon the respective radio model, as updated, of an existing access point. See block 56 of FIG. 8. Consequently, the accuracy of the radio model of the first access point may be enhanced based upon an update to the radio model of an existing access point in an instance in which only a few probe points have been collected for the first access point, such as less than the predetermined number of probe points. However, in an instance in which a larger number of probe points have been collected for the first access point, such as at least the predetermined number of probe points, the radio model for the first access point may not be updated, thereby conserving computing resources in this instance since the accuracy of the radio model of the first access point is likely greater based upon the larger number of probe points that have been utilized to define the radio model.

FIGS. 5, 7 and 8 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 24 of an apparatus 20 employing an embodiment of the present invention and executed by the processing circuitry 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for accelerating estimation of a radio model of a first access point, the method comprising:
   determining a presence of the first access point in a radio environment;
   determining signal propagation characteristics of one or more existing access points in the radio environment as represented by respective radio models of the one or more existing access points; and
   estimating the radio model of the first access point based at least upon the signal propagation characteristics of the one or more existing access points in the radio environment as represented by the respective radio models of the one or more existing access points, wherein estimating the radio model of the first access point based at least upon the signal propagation characteristics of the one or more existing access points comprises estimating the radio model of the first access point based upon at least one of a size or shape of the respective radio models of the one or more existing access points.

2. A method according to claim 1, wherein estimating the radio model of the first access point based at least upon the signal propagation characteristics of the one or more existing access points further comprises estimating the radio model of the first access point based upon at least a shape of the respective radio models of the one or more existing access points relative to an obstacle within the radio environment, wherein the obstacle comprises an obstacle to signal propagation within the radio environment.

3. A method according to claim 2, further comprising determining one or more of presence or characteristics of the obstacle based on signal propagation characteristics of respective radio models of the one or more existing access points, wherein estimating the radio model of the first access point based upon signal propagation characteristics of one or more existing access points comprises estimating the radio model of the first access point based on one or more of the determined presence or signal propagation characteristics of the obstacle.

4. A method according to claim 1, wherein estimating the radio model of the first access point based at least upon the signal propagation characteristics of the one or more existing access points comprises weighting contributions of the respective radio models of the one or more existing access points to estimation of the radio model of the first access point based upon one or more of a number of probe points that have been collected for respective ones of the existing access points, a time elapsed since the probe points have been collected for respective ones of the existing access points or a degree of similarity between the respective radio models of the existing access points.

5. A method according to claim 1, wherein estimating the radio model of the first access point based at least upon the signal propagation characteristics of the one or more existing access points comprises weighting contributions of the respective radio models of the one or more existing access points to estimation of the radio model of the first access point based upon relative positions of the first access point and the one or more existing access points to an obstacle within the radio environment, wherein the obstacle comprises an obstacle to signal propagation within the radio environment.

6. A method according to claim 5, wherein weighting contributions of the respective radio models of the one or more existing access points comprises weighting contributions of the respective radio models of the one or more existing access points to the estimation of the radio model of the first access point based upon information regarding respective positions of the first access point and the one or more existing access points and information regarding a position and orientation of the obstacle to signal propagation within the radio environment.

7. A method according to claim 1, further comprising receiving one or more probe points for the first access point following estimation of the radio model of the first access point, wherein estimating the radio model of the first access point is further based on the received one or more probe points for the first access point.

8. A method according to claim 1, further comprising:
updating the respective radio model of at least one of the one or more existing access points following estimation of the radio model of the first access point based at least upon the signal propagation characteristics of the one or more existing access points; and determining whether to update the radio model of the first access point based upon the respective radio model, following the updating, based upon a number of probe points that have been collected for the first access point.

9. A method according to claim 1, further comprising determining a location of a mobile device at least partially based upon an estimation of the radio model of the first access point, wherein determining the location of the mobile device comprises weighting a contribution of the estimation of the radio model of the first access point based upon a number of probe points that have been collected for the first access point.

10. A method according to claim 1, wherein determining the presence of the first access point in the radio environment comprises determining the presence of the first access point that has been added to the radio environment following estimation of the respective radio models of the one or more existing access points.

11. An apparatus configured to accelerate estimation of a radio model of a first access point, the apparatus comprising processing circuitry and at least one memory including computer program code instructions, the computer program code instructions configured to, when executed by the processing circuitry, cause the apparatus to:
determine a presence of the first access point in a radio environment;
determine signal propagation characteristics of one or more existing access points in the radio environment as represented by respective radio models of the one or more existing access points; and
estimate the radio model of the first access point based at least upon the signal propagation characteristics of the one or more existing access points in the radio environment as represented by the respective radio models of the one or more existing access points, wherein estimating the radio model of the first access point based at least upon the signal propagation characteristics of the one or more existing access points comprises estimating the radio model of the first access point based upon at least a shape of the respective radio models of the one or more existing access points relative to an obstacle within the radio environment, wherein the obstacle comprises an obstacle to signal propagation within the radio environment.

12. An apparatus according to claim 11, wherein the computer program code instructions configured to estimate the radio model of the first access point based at least upon the signal propagation characteristics of the one or more existing access points further comprise computer program code instructions configured to estimate the radio model of the first access point based upon at least one of a size or shape of the respective radio models of the one or more existing access points.

13. An apparatus according to claim 11, wherein the computer program code instructions configured to estimate the radio model of the first access point based at least upon the signal propagation characteristics of the one or more existing access points comprise computer program code instructions configured to weight contributions of the respective radio models of the one or more existing access points to estimation of the radio model of the first access point based upon one or more of a number of probe points that have been collected for respective ones of the existing access points, a time elapsed since the probe points have been collected for respective ones of the existing access points or a degree of similarity between the respective radio models of the existing access points.

14. An apparatus according to claim 11, wherein the computer program code instructions configured to estimate the radio model of the first access point based at least upon the signal propagation characteristics of the one or more existing access points comprise computer program code instructions configured to weight contributions of the respective radio models of the one or more existing access points to estimation of the radio model of the first access point based upon relative positions of the first access point and the one or more existing access points to an obstacle within the radio environment, wherein the obstacle comprises an obstacle to signal propagation within the radio environment.

15. An apparatus according to claim 11, wherein the computer program code instructions are further configured to, when executed by the processing circuitry, cause the apparatus to determine a location of a mobile device at least partially based upon an estimation of a radio model of the first access point, wherein computer program code instructions configured to determine the location of the mobile device comprise computer program code instructions configured to weight a contribution of the estimation of the radio model of the first access point based upon a number of probe points that have been collected for the first access point.

16. A computer program product configured to accelerate estimation of a radio model of a first access point, the computer program product comprising at least one non-transitory computer-readable storage medium having computer-executable program code instructions stored therein, the computer-executable program code instructions comprising program code instructions to:

determine a presence of the first access point in a radio environment;

determine signal propagation characteristics of one or more existing access points in the radio environment as represented by respective radio models of the one or more existing access points; and estimate the radio model of the first access point based at least upon the signal propagation characteristics of the one or more existing access points in the radio environment as represented by the respective radio models of the one or more existing access points, wherein estimating the radio model of the first access point based at least upon the signal propagation characteristics of the one or more existing access points comprises estimating the radio model of the first access point based upon at least one of a size or shape of the respective radio models of the one or more existing access points.

17. A computer program product according to claim 16, wherein the program code instructions configured to estimate the radio model of the first access point based at least upon the signal propagation characteristics of the one or more existing access points further comprise program code instructions configured to estimate the radio model of the first access point based upon at least a shape of the respective radio models of the one or more existing access points relative to an obstacle within the radio environment, wherein the obstacle comprises an obstacle to signal propagation within the radio environment.

* * * * *